US011722868B2

(12) United States Patent
Joyce et al.

(10) Patent No.: US 11,722,868 B2
(45) Date of Patent: Aug. 8, 2023

(54) NETWORK-AWARE DEPLOYMENT OPTIMIZATION FOR LARGE SCALE VIRTUAL NETWORK FUNCTION DEPLOYMENTS AT A NETWORK EDGE

(71) Applicant: Verizon Patent and Licensing Inc., Basking Ridge, NJ (US)

(72) Inventors: John J. Joyce, Pittsburgh, PA (US); Ravi Potluri, Coppell, TX (US); Sachinder D. Reddy, Plano, TX (US); Sunny Pal Singh, McKinney, TX (US); Umashankar Velusamy, Tampa, FL (US); Jason T. Wright, Novi, MI (US); Yang Xu, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 17/319,294

(22) Filed: May 13, 2021

(65) Prior Publication Data
US 2022/0369084 A1 Nov. 17, 2022

(51) Int. Cl.
*H04L 67/00* (2022.01)
*H04W 40/24* (2009.01)
*H04W 4/50* (2018.01)
*H04W 28/16* (2009.01)

(52) U.S. Cl.
CPC ............... *H04W 4/50* (2018.02); *H04L 67/34* (2013.01); *H04W 28/16* (2013.01); *H04W 40/246* (2013.01)

(58) Field of Classification Search
CPC ..... H04W 4/50; H04W 28/16; H04W 40/246; H04L 67/34
See application file for complete search history.

(56) References Cited

U.S. PATENT DOCUMENTS

| 2021/0218798 A1* | 7/2021 | Jethanandani ...... H04L 41/0895 |
| 2022/0191731 A1* | 6/2022 | Osman .................... H04W 8/18 |

* cited by examiner

*Primary Examiner* — Joseph E Dean, Jr.

(57) ABSTRACT

Systems and methods described herein provide deployment optimization service. A network device in a network receives an order for virtual network function (VNF) deployments at network edge locations. The network device maps a radio access network (RAN) topology for the network edge locations. The network device identifies time windows to perform the VNF deployments, based on the order, historical transport and RAN utilization data, and the RAN topology. The network device selects an optimal time window to perform the VNF deployments based on stored policy rules and pushes software images for the VNF deployments to an image repository in a geographical region near the network edge locations. The network device analyzes, for the optimal time window, real-time network data for a pre-emptive condition. The network device pre-empts the VNF deployments when a pre-emptive condition is identified and initiates the VNF deployments when no pre-emptive condition is identified.

20 Claims, 6 Drawing Sheets

NETWORK-AWARE DEPLOYMENT OPTIMIZATION FOR LARGE SCALE VIRTUAL NETWORK FUNCTION DEPLOYMENTS AT A NETWORK EDGE

BACKGROUND

To meet the diverse demands of mobile communication users, providers of wireless communication services continue to develop application service offerings and provision data transport domains for their delivery. One enhancement includes the development of disaggregated network architectures along with optimized provisioning management. Virtualized transport domains may connect different network functions (e.g., virtual network functions or VNFs) for application services requiring varying service levels (e.g., throughput, latency). Given network traffic realities, the limited number of paths that are capable of maintaining a particular level of service poses various technological challenges from a network-side perspective and an end device perspective.

DETAILED DESCRIPTION OF EXAMPLE EMBODIMENTS

The following detailed description refers to the accompanying drawings. The same reference numbers in different drawings may identify the same or similar elements.

Software-defined networking (SDN) and/or network function virtualization (NFV) may allow network functions (NFs) of a wireless telecommunications network to execute from reconfigurable resources of function-agnostic hardware. For a virtual network function (VNF) at a network edge, there are a number of challenges associated with deployments at scale at a network edge. For example, these VNFs periodically require software or firmware updates to continue operating properly, as well as require new features to address bugs (e.g., software bugs).

Software images, such as ISO image files, used for VNF deployments or upgrades often include large file sizes (e.g., multiple gigabytes). Performing a software or firmware update on a large number of edge devices may use significant network resources and may cause congestion and other issues on the network. Particularly, bandwidth limitations to the network edge necessitate careful planning of image file movement and VNF deployments to avoid disruption of subscriber traffic. Furthermore, planned deployments/upgrades need to be able to accommodate unforeseen network events and localized temporary spikes in traffic, while maintaining the integrity of deployment/upgrade processes.

Systems and methods described herein provide a deployment optimization service. According to an implementation, a network device in a provider network may receive an order for VNF deployments at network edge locations. The network device may map a radio access network (RAN) topology for the network edge locations. The network device may identify time windows to perform the VNF deployments, based on the order, historical transport and RAN utilization data, and/or the RAN topology. The network device may select an optimal time window to perform the VNF deployments based on stored policy rules and may push software images for the VNF deployments to an image repository in a geographical region near the network edge locations. The network device may analyze, for the optimal time window, real-time network data for a pre-emptive condition. The network device may pre-empt the VNF deployments when a pre-emptive condition is identified and may initiate the VNF deployments when no pre-emptive condition is identified.

Figure 1:
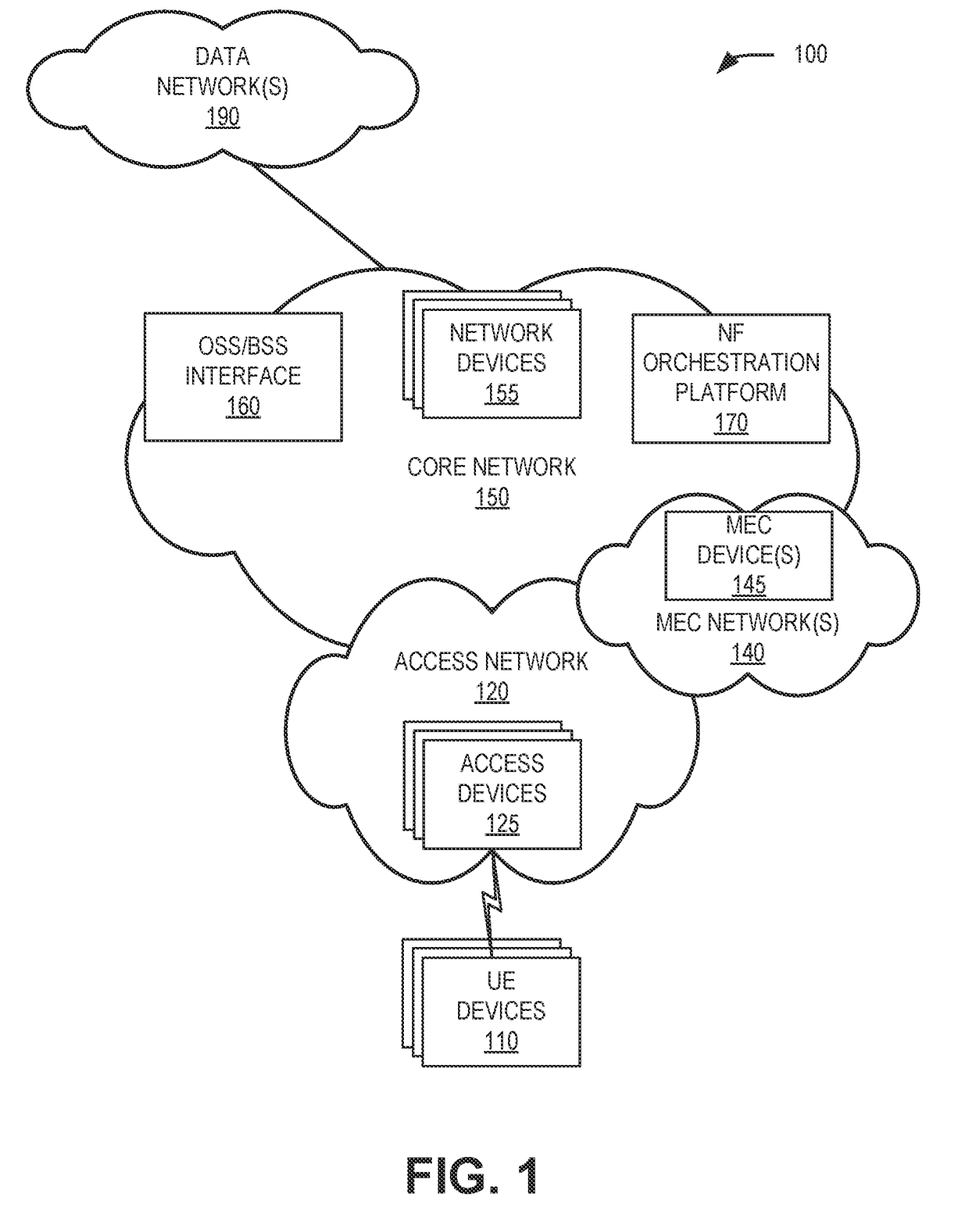
FIGS. 1 and 2 are diagrams illustrating a network environment according to an implementation described herein.

FIG. 1 is a diagram of an exemplary environment 100 in which the systems and/or methods, described herein, may be implemented. As shown in FIG. 1, environment 100 may include user equipment (UE) devices 110, an access network 120 that includes access devices 125, multi-access edge computing (MEC) network(s) 140 that include MEC device(s) 145, a core network 150 that includes network device(s) 155, an operations support system (OSS)/business support system (BSS) interface 160, and a NF orchestration platform 170, and data networks 190.

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a WiFi access point, a portable gaming system, an Internet-of-Things device, and/or any other type of computer device with wireless communication capabilities.

Access network 120 may include a RAN that enables UE devices 110 to connect to core network 150 via access devices 125 using wireless signals. For example, access network 120 may include one or more central units (CUs) and distributed units (DUs) (not shown in FIG. 1) that enable and manage connections from access device 125 to core network 150. Access network 120 may include features associated with an LTE Advanced (LTE-A) network and/or a 5G core network or other advanced network, such as management of 5G New Radio (NR) base stations; carrier aggregation; advanced or massive multiple-input and multiple-output (MIMO) configurations (e.g., an 8×8 antenna configuration, a 16×16 antenna configuration, etc.); relay stations; Heterogeneous Networks (HetNets) of overlapping small cells and macrocells; Self-Organizing Network (SON) functionality; Machine-type Communications (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access device 125 may include a 5G NR base station (e.g., a gNodeB) and/or a Fourth Generation (4G) Long Term Evolution (LTE) base station (e.g., an eNodeB). Each access device 125 may include devices and/or components configured to enable wireless communication with UE devices 110. For example, access device 125 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Access device 125 may enable communication with core network 150 to enable core network 150 to authenticate UE device 110. Access device 125 is described further in connection with FIG. 2.

Each MEC network 140 may be associated with one or more access devices 125 and may provide MEC services for UE devices 110 attached to the one or more access devices 125. MEC network 140 may be in proximity to the one or more access devices 125 from a geographic and network topology perspective, thus enabling low latency communication with UE devices 110 and/or access devices 125. As an example, MEC network 140 may be located on a same site as one of the one or more access devices 125. As another example, MEC network 140 may be geographically closer to the one or more access devices 125, and reachable via fewer network hops and/or fewer switches, than other access devices 125 and/or data networks 190.

MEC network 140 may include one or more MEC devices 145 that may provide MEC services to UE devices 110, such as, for example, content delivery of streaming audio and/or video, cloud computing services, authentication services, etc. In some implementations, MEC devices 145 may host deployed VNFs used to implement particular network slices. Thus, MEC devices 145 may form part of an infrastructure for hosting network slices.

Core network 150 may be managed by a provider of cellular wireless communication services and may manage communication sessions of subscribers connecting to core network 150 via access network 120. For example, core network 150 may establish an Internet Protocol (IP) connection between UE devices 110 and data network 190. In some implementations, core network 150 may include a 5G core network. A 5G core network may perform registration management, connection management, reachability management, mobility management, lawful intercepts, session management, session modification, session release, IP allocation and management, Dynamic Host Configuration Protocol (DHCP) functions, etc. In other implementations, core network 150 may also include a 4G LTE core network (e.g., an evolved packet core (EPC) network).

Core network 150 may include network device(s) 155. Network device 155 may include a 5G NF; a 4G network node; a transport network device, such as, for example, a switch, router, firewall, gateway, an optical switching device (e.g., a reconfigurable optical add-drop multiplexer, etc.), and/or another type of network device. Network device 155 may include a physical function node or a VNF. Thus, the components of core network 150 may be implemented as dedicated hardware components and/or as VNFs implemented on top of a common shared physical infrastructure using software defined networking. Core network 150 may also be referred to herein as a transport network.

OSS/BSS interface 160 may interface with operations support systems, such as a network monitoring system, a network provisioning system, a network management system, a testing system, and/or other types of OSS. Furthermore, OSS/BSS interface 160 may interface with business support systems, such as an ordering system, a customer service system, and/or a billing system. OSS/BSS interface 160 may enable an OSS and/or BSS to manage the virtualized components of access network 120, and/or core network 150. Furthermore, OSS/BSS 160 may interface with a Self-Organizing and/or Self-Optimizing Network (SON) system to perform planning, configuration, management, optimization, and/or healing of access network 120 and/or core network 150.

NF orchestration platform 170 may include one or more computer devices, such as server devices, to design and orchestrate virtual network functions in access network 120 and/or core network 150. NF orchestration platform 170 may include logic for designing, testing, deploying, and adapting network functions. For example, slice orchestration platform 170 may determine whether a particular virtual network function should be admitted and deployed on a particular infrastructure. NF orchestration platform 170 may admit a virtual network function based on requirements associated with the virtual network function, based on an estimated load associated with the virtual network function, and/or based on a projected load for resources required to implement the virtual network function. Furthermore, in some implementations, NF orchestration platform 170 may determine whether a VNF instance in access network 120 is to be created, deleted, and/or modified.

Data network 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Data network 190 may be associated with an Access Point Name (APN) and UE device 110 may request a connection to the particular data network 190 using the APN.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. For example, while OSS/BSS interface 160 and NF orchestration platform 170 are shown as separate systems in FIG. 1, in other implementations, NF orchestration platform 170 may include and/or be combined with OSS/BSS interface 160.

Figure 2:
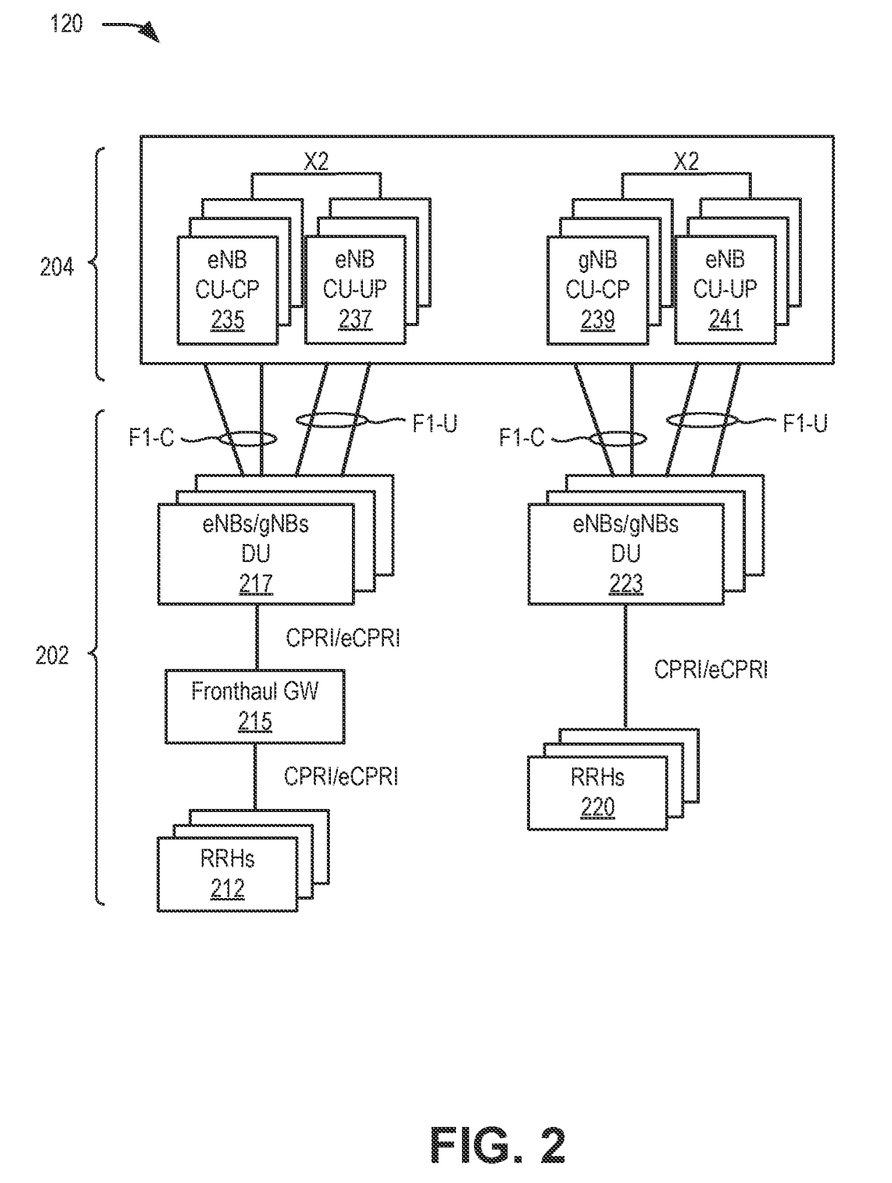

FIG. 2 is a diagram illustrating a configuration of access devices 125 in access network 120 consistent with environment 100, as described herein. As illustrated, access network 120 may include elements of a disaggregated RAN. The communication links and interfaces illustrated and described are exemplary in terms of number, connectivity, and type. The interfaces may be implemented as reference point-based or service-based.

As illustrated, access network 120 may include a first layer of 202 and a second layer 204. First layer 202 may include remote radio head (RRH) devices 212, a fronthaul gateway (GW) 215, eNBs/gNBs 217, RRH devices 220, and eNBs/gNBs 223. As further illustrated, these functions may use various interfaces and communication links, such as for example, Common Public Radio Interface (CPRI), enhanced CPRI (eCPRI), F1 interfaces that support the control plane and the user plane, and next generation interfaces. These interfaces and communication links may support 4G systems (e.g., LTE, LTE-A, LTE-A Pro) and 5G systems (e.g., NR). As illustrated, eNBs/gNBs 217 and 223 may be implemented as DUs that support the control plane and the user plane. Fronthaul gateway 215 may include a network device that supports a fronthaul transport network service between RRH devices and DUs.

Second layer 204 may include eNBs 235, eNBs 237, gNBs 239, and eNBs 241 that are implemented as CUs that support the control plane and the user plane. As further illustrated, these functions may use various interfaces, such as F1 interfaces that support the control plane and user plane, and allow communication with access devices 125 of first layer 202 via the communication links.

A CU-control plane (CP) and CU-user plane (UP) (collectively referred to as CU) in layer 204 and one or more DUs and RRHs may be considered part of the same access device 125. However, the CU does not need to be physically located near the DU, and may be implemented as cloud computing elements, through network function virtualization capabilities of the cloud. CUs, DUs and fronthaul gateway may be collectively referred to herein as "virtual RAN (VRAN) elements." According to some implementations, different VRAN elements for the same access device 125 (e.g., a gNB or eNB) may be provided by different vendors. As described herein, NF orchestration platform 170 may use the deployment optimization service described herein to identify, optimize and coordinate the deployments of virtual RAN elements at scale.

Figure 3:
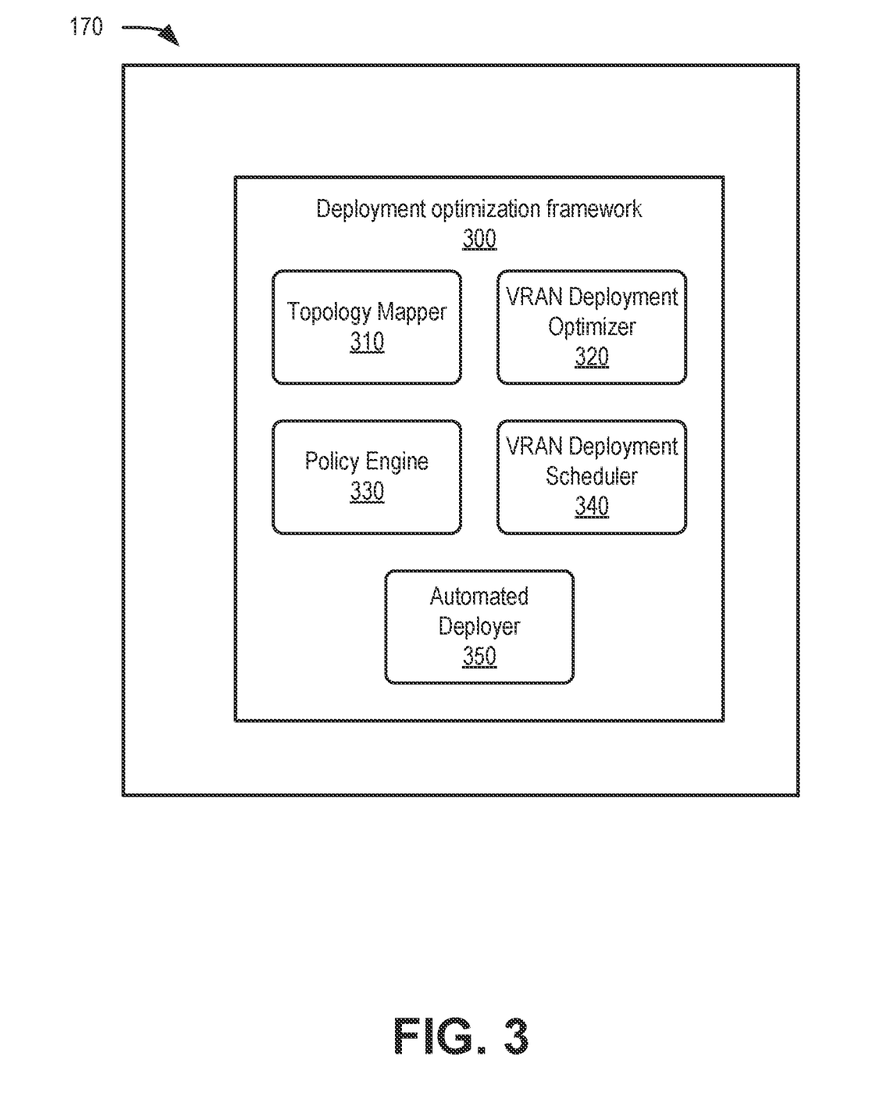
FIG. 3 is a diagram illustrating logical components of a deployment optimization framework, according to an implementation.

FIG. 3 is a block diagram illustrating some exemplary logical components of a deployment optimization framework 300 that implements the deployment optimization service. Deployment optimization framework 300 may be included in or in communication with NF orchestration platform 170. As shown in FIG. 3, deployment optimization framework 300 may include topology mapper 310, a VRAN deployment optimizer 320, a policy engine 330, a VRAN deployment scheduler 340, and an automated deployer 350.

Topology mapper 310 may provide multiple ways to identify topology dependencies among the VRAN elements of access network 120. According to an implementation, topology mapper 310 may perform standardized function topology mapping, across all elements of a gNB (e.g., CU, DUs, etc.), regardless of the vendors providing the elements. Standardized function topology mapping may map changes to standardized components of access network 120, such as a gNB, a gNB-CU, or a gNB-DU as defined by 3GPP standards. Topology mapper 310 may also provide geography-based mapping, based on the operations layout, by providing the mapping within a market and/or region. Furthermore, topology mapper 310 may provide element-based mapping, extending the 3GPP mapping to include the possibilities where multiple gNBs are supported by a single CU. Topology mapper 310 may also generate a list of impacted Element Management System (EMS) instances based on the element mapping, as one or more EMS instances may be involved in the deployment process. For example, topology mapper 310 may map changes to impacted EMS instances, virtual CUs (VCUs) and/or virtual DUs (VDUs), where the VCUs and VDUs may support multiple gNBs.

VRAN deployment optimizer 320 may provide analytics-derived intelligence (e.g., machine learning) for the deployment optimization service. VRAN deployment optimizer 320 may receive time-series analytics for RAN and transport network elements (e.g., Ethernet backhaul (EBH), cell uplink/downlink throughput, etc.). VRAN deployment optimizer 320 may also obtain recent transport network utilization data from a transport controller for specific segments of the network. VRAN deployment optimizer 320 may identify one or more best time windows (or time slots) for moving software updates/images (e.g., ISO image files), as well as upgrades, for a specific deployment by deriving the windows based on site-specific data as well as required window sizes. According to an implementation, VRAN deployment optimizer 320 may rank the windows and probability of customer impact. VRAN deployment optimizer 320 may also recommend which image server (e.g., CP image repository 430, described below) and routing path (assuming source routing is supported) to choose for a particular window. For selected windows, VRAN deployment optimizer 320 may monitor the transport network, to detect unforeseen spikes, by communicating with a transport controller (e.g., transport controller 425, described below). When necessary, VRAN deployment optimizer 320 may trigger preemption of scheduled deployments/upgrades based on network events.

Policy engine 330 may be a policy component of NF orchestration platform 170 which provides policy inputs to VRAN deployment scheduler 340 and VRAN deployment optimizer 320. Policy engine 330 may control aspects of the workflow for a requested deployment, such as schedule window preferences, task splits for concurrency, preemption of tasks, moratoriums to impose, etc. Policy engine 330 may govern selection of open loop versus closed loop control of the deployment optimization service.

VRAN deployment scheduler 340 may provide visibility and scheduling capability to operations teams of a service provider. VRAN deployment scheduler 340 may accept input from VRAN deployment optimizer 320 and present schedules to operations teams based on the selected windows. VRAN deployment scheduler 340 may schedule the disruptive (e.g., with potential impact to customer traffic) and non-disruptive subtasks. In some implementations, VRAN deployment scheduler 340 may apply preemption triggers from policy engine 330 and automatically reschedule subtasks.

Automated deployer 350 may act as a workflow manager which runs a pre-scheduled workflow from VRAN deployment scheduler 340, providing feedback on the success/failure of the subtasks.

Although FIG. 3 illustrates certain logical components of deployment optimization framework 300, in other implementations, deployment optimization framework 300 may include fewer, different, or additional logical components than depicted in FIG. 3. Additionally or alternatively, one or more logical components of deployment optimization framework 300 may perform functions described as being performed by one or more other logical components.

Figure 4:
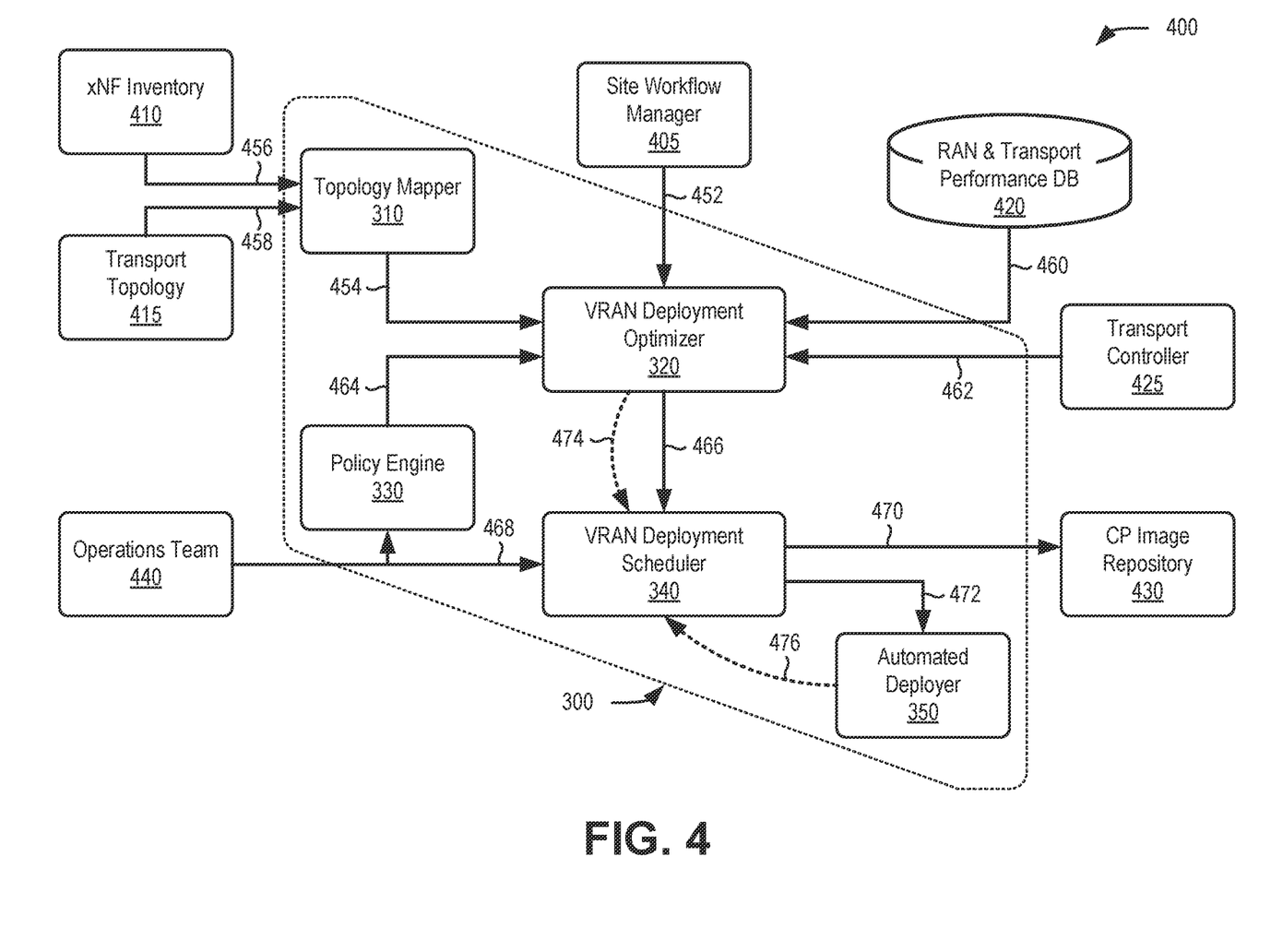
FIG. 4 is a diagram illustrating example communications of a deployment optimization service.

FIG. 4 is a diagram illustrating exemplary communications for implementing the assisted network change service in a portion 400 of network environment 100. FIG. 4 provides simplified illustrations of communications in network portion 400 and is not intended to reflect every signal or communication exchanged between devices/functions.

As shown in FIG. 4, network portion 400 may include deployment optimization framework 300, a site workflow manager 405, an xNF inventory 410, a transport topology 415, a RAN and transport performance database (DB) 420, a transport controller 425, and a cloud platform (CP) image repository 430. According to one implementation, one or more of site workflow manager 405, xNF inventory 410, transport topology 415, RAN and transport performance database 420, transport controller 425, and CP image repository 430 may be included in NF orchestration platform 170. In another implementation, one or more of site workflow manager 405, xNF inventory 410, transport topology 415, RAN and transport performance database 420, transport controller 425, and CP image repository 430 may be existing components of core network 150 (e.g., network devices 155).

As shown in FIG. 4, VRAN deployment optimizer 320 may receive deployment or upgrade instructions 452 from site workflow manager 405 or a business system. Instructions 452 may include, for example, deployment requirements and a list of software images/updates for a VNF or service. The list of software images may identify a file size for the image/update, which may be used to determine, for example, download times and/or bandwidth requirements. In other implementations, instructions 452 may also include a default deployment schedule to be optimized.

In response to instructions 452, VRAN deployment optimizer 320 may obtain topology mapping information 454 from topology mapper 310. Topology mapping information 454 may include standardized function mapping 456 from xNF inventory 410, geographical mapping 458 from transport topology 415, and/or element-based mapping based on standardized function mapping 456 and geographical mapping 458. Topology mapping information 454 may be used to identify and group impacted network elements for a deployment.

VRAN deployment optimizer 320 may obtain historical RAN and transport network performance data 460 from RAN and transport performance database 420. RAN and transport performance database 420 may include, for example, a data lake compiling performance data from multiple network sources. RAN and transport network performance data 460 may be used to project timeslots of availability for the impacted network elements. VRAN deployment optimizer 320 may also obtain from transport controller 425 real-time transport network status 462 along with real-time VLAN and usage data. Real-time transport network status 462 may provide information to supplement or override available timeslot projections.

Policy engine 330 may provide policy input 464 to VRAN deployment optimizer 320. Policy input 464 may indicate, for example, barred blocks of time (regardless of historical projections); priorities for certain types of network elements, markets or locations, sites; etc. Policy input 464 may provide guidance for whether a particular type of deployment may operate as a closed loop (e.g., automated deployment adjusted based on internal feedback) or an open loop (e.g., requiring operations team input) within the assisted network change service. Policy input 464 may also indicate triggers (e.g., real-time load thresholds, fault rates, etc.) for preempting a scheduled deployment.

Based on instructions 452, topology mapping information 454, and historical RAN and transport network performance data 460, VRAN deployment optimizer 320 may identify available timeslots for a VNF deployment. VRAN deployment optimizer 320 may then apply policy input 464 to filter and/or prioritize the available timeslots to determine the optimized deployment windows. As indicate by reference 466, VRAN deployment optimizer 320 may provide the optimized deployment window to VRAN deployment scheduler 340.

VRAN deployment scheduler 340 may present a schedule using the optimized deployment window to operations team 440 for viewing/approval 468. Assuming approval from the operations team 440, VRAN deployment scheduler 340 may schedule the individual subtasks for implementation. VRAN deployment scheduler 340 may conduct an image push 470 to one or more applicable cloud platform image repositories. For example image push 470 may provide the deployment's software image to a local or regional network location relatively close to the deployment site. VRAN deployment scheduler 340 may also provide the optimized deployment schedule 472 to automated deployer 350 to initiate the VNF deployment within the scheduled window.

For closed loop operations, automated deployer 350 may provide feedback 476 to VRAN deployment scheduler 340 to report, for example, on completion of subtasks in optimized deployment schedule 472. When feedback 476 indicates a deployment failure or partial success scenario, VRAN deployment scheduler 340 may, based on rules in policy engine 330, either reschedule the deployment or refer to the operations team (e.g., operations team 440) for troubleshooting. In the event that policy engine 330 provides rules to reschedule a partial/failed deployment, VRAN deployment scheduler 340 may signal VRAN deployment optimizer 320 to generate an updated optimized deployment window 466.

In some implementations, for closed loop operations, VRAN deployment optimizer 320 may monitor real-time transport network status 462 for a deployment window and may identify when real-time conditions are inconsistent with historical projection (e.g., with loads above expected levels) and/or when real-time conditions violate policy rules. If VRAN deployment optimizer 320 detects an inconsistency in network conditions for the optimized deployment schedule, VRAN deployment optimizer 320 may send a preemption trigger 474 to VRAN deployment scheduler 340. Preemption trigger 474 may cause VRAN deployment scheduler 340 to, for example, pause the deployment and reschedule as described above in the event of a partial/failed deployment.

Figure 5:
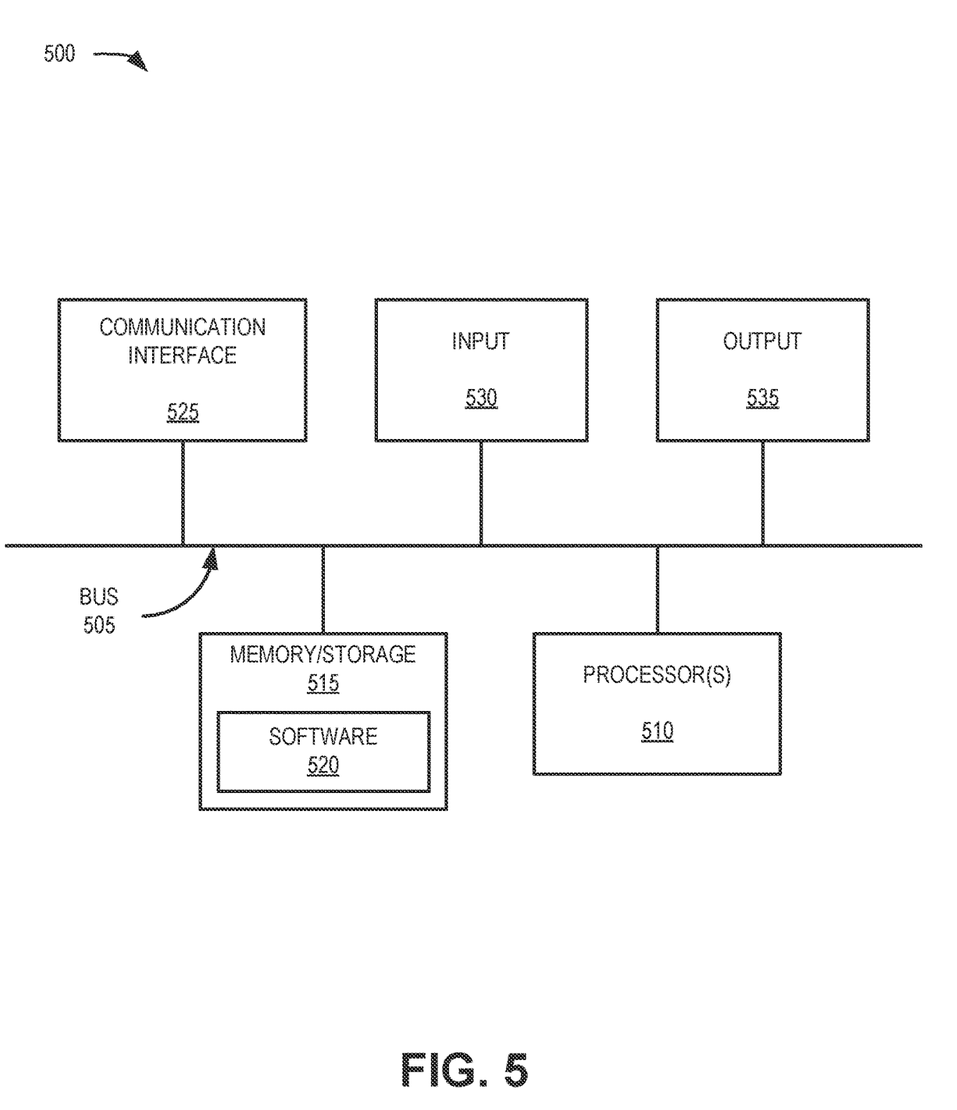
FIG. 5 is a diagram illustrating an example device for implementing a deployment optimization service, according to an implementation.

FIG. 5 is a diagram illustrating exemplary components of a device 500 that may correspond to one or more of the devices described herein. For example, device 500 may correspond to components included in UE device 110, access devices 125, MEC devices 145, network devices 155, OSS/BSS interface 160, NF orchestration platform 170, and devices illustrated in FIGS. 3 and 4. As illustrated in FIG. 5, according to an exemplary embodiment, device 500 includes a bus 505, processor 510, memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, and/or clocks.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc. Processor 510 may be a dedicated component or a non-dedicated component (e.g., a shared resource).

Processor 510 may control the overall operation or a portion of operations performed by device 500. Processor 510 may perform operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include a drive for reading from and writing to the storage medium.

Memory/storage 515 may be external to and/or removable from device 500, such as, for example, a Universal Serial Bus (USB) memory stick, a dongle, a hard disk, mass storage, off-line storage, network attached storage (NAS), or some other type of storage medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. Software 520 may include an operating system. Software 520 is also intended to include firmware, middleware, microcode, hardware description language (HDL), and/or other forms of instruction. For example, according to an implementation, software 520 may implement portions of topology mapper 310, VRAN deployment optimizer 320, and VRAN deployment scheduler 340.

Communication interface 525 permits device 500 to communicate with other devices, networks, systems, devices, and/or the like. Communication interface 525 includes one or multiple wireless interfaces and/or wired interfaces. For example, communication interface 525 may include one or multiple transmitters and receivers, or transceivers. Communication interface 525 may include one or more antennas. For example, communication interface 525 may include an array of antennas. Communication interface 525 may operate according to a protocol stack and a communication standard. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 535 permits an output from device 500. For example, output 535 may include a speaker, a display, a light, an output port, and/or some other type of visual, auditory, tactile, etc., output component. According to some embodiments, input 530 and/or output 535 may be a device that is attachable to and removable from device 500.

Device 500 may perform a process and/or a function, as described herein, in response to processor 510 executing software 520 in a computer-readable medium, such as memory/storage 515. A computer-readable medium may be defined as a non-transitory memory device. A memory device may be implemented within a single physical memory device or spread across multiple physical memory devices. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
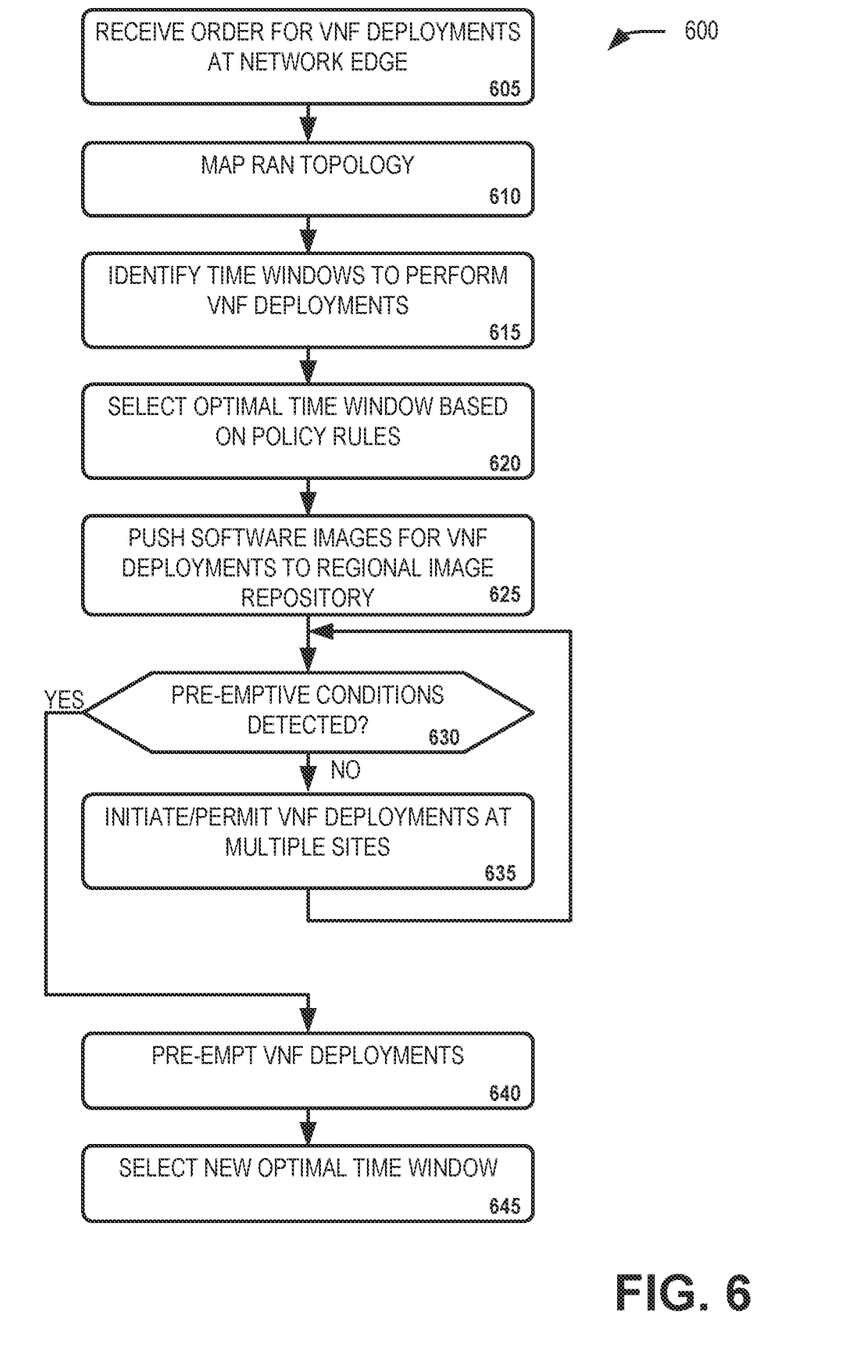
FIG. 6 is a flow diagram illustrating a process for initiating a VNF deployment using a deployment optimization service, according to an implementation.

FIG. 6 is a flow diagram illustrating an exemplary process 600 for initiating a VNF deployment using a deployment optimization service, according to an implementation described herein. In one implementation, process 600 may be implemented by deployment optimization framework 300. In another implementation, process 600 may be implemented by deployment optimization framework 300 in conjunction with one or more other devices in network environment 100.

Process 600 may include receiving an order for VNF deployments at network edge locations (block 605), and mapping a RAN topology for multiple sites (block 610). For example, VRAN deployment optimizer 320 may receive deployment or upgrade instructions from a workflow manager or a business system. The instructions may include deployment requirements and a list of software images for a VNF or service to be deployed at a particular site, market, or network-function-type. In response to the instructions, VRAN deployment optimizer 320 may obtain topology mapping information from topology mapper 310. Topology mapping information 454 may include standardized function mapping, geographical mapping, and/or element-based mapping.

Process 600 may also include identifying one or more time windows to perform the VNF deployments (block 615). For example, VRAN deployment optimizer 320 may obtain historical RAN and transport network performance data. VRAN deployment optimizer 320 may project timeslots of availability for the network elements impacted by the VNF deployments based on the order, historical transport and RAN utilization data, and the RAN topology.

Process 600 may further include selecting an optimal time window to perform the VNF deployments based on stored policy rules (block 620) and pushing software images for the VNF deployments to image repositories in a geographical region near the deployment sites (block 625), and analyzing real-time transport network and RAN status data for pre-emptive conditions (block 630). For example, VRAN deployment optimizer 320 may apply policy input to filter and/or prioritize available timeslots to determine optimized deployment windows. VRAN deployment optimizer 320 may provide the optimized deployment window to VRAN deployment scheduler 340, which may conduct an image push to one or more applicable cloud platform image repositories (e.g., CP image repository 430). VRAN deployment optimizer 320 may monitor real-time transport network status and may identify when real-time conditions are inconsistent with historical projection and/or when real-time conditions violate policy rules using, for example, RAN and transport network performance data 460, real-time transport network status 462, and policy input 464.

When there is no pre-emptive condition (block 630—No), process 600 may include initiating the VNF deployments at the multiple sites (block 635). For example, VRAN deployment scheduler 340 may provide the optimized deployment schedule to automated deployer 350 to initiate the VNF deployment within the scheduled window.

When there is a pre-emptive condition (block 630—Yes), process 600 may additionally include pre-empting the VNF deployments (block 640) and selecting a new optimal time window (block 645). For example, VRAN deployment optimizer 320 may send a preemption trigger (e.g., preemption trigger 474) to VRAN deployment scheduler 340. The preemption trigger may cause VRAN deployment scheduler 340 to, for example, pause the deployment, identify a new time optimal time window, and reschedule/or the VNF deployment.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 4, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, in a network, an order for virtual network function (VNF) deployments at network edge locations;
   mapping a radio access network (RAN) topology for each of the network edge locations;
   identifying one or more time windows to perform the VNF deployments, based on the order, historical transport and RAN utilization data, and the RAN topology;
   selecting, from the one or more time windows, a first time window to perform the VNF deployments based on stored policy rules;
   pushing software images for the VNF deployments to an image repository in a geographical region near the network edge locations;
   analyzing, for the first time window, real-time transport network and RAN status data for a pre-emptive condition;
   pre-empting the VNF deployments when the pre-emptive condition is identified; and
   initiating the VNF deployments at the network edge locations when no pre-emptive condition is identified.

2. The method of claim 1, wherein mapping the RAN topology includes:
   mapping standardized functions of the RAN, and
   mapping geographical locations of RAN components.

3. The method of claim 2, wherein. mapping the RAN topology further includes:
   mapping RAN elements based on the standardized function mapping and the geographical mapping, wherein the RAN elements include virtual central units that support multiple gNodeBs.

4. The method of claim 1, wherein the pre-emptive condition includes:
   a real-time network condition that is inconsistent with a historical projection, or
   a real-time network condition that violates the policy rules.

5. The method of claim 1, wherein receiving the order for VNF deployments includes:
   receiving a list of software images and applicable markets or locations for the VNF deployments.

6. The method of claim 1, further comprising:
   soliciting, prior to the pushing, user input to authorize the VNF deployments for the first time window.

7. The method of claim 1, wherein pre-empting the VNF deployments comprises:
   pausing the VNF deployments, and
   automatically selecting a second time window to perform the VNF deployments.

8. The method of claim 1, wherein identifying the one or more time windows to perform the VNF deployments is further based on the real-time transport network and RAN status data.

9. A system, comprising:
   one or more processors configured to:
      receive, in a network, an order for virtual network function (VNF) deployments at network edge locations;

map a radio access network (RAN) topology for each
of the network edge locations;
identify one or more time windows to perform the VNF
deployments, based on the order, historical transport
and RAN utilization data, and the RAN topology;
select, from the one or more time windows, a first time
window to perform the VNF deployments based on
stored policy rules;
push software images for the VNF deployments to an
image repository in a geographical region near the
network edge locations;
analyze, for the first time window, real-time transport
network and RAN status data for a pre-emptive
condition;
pre-empt the VNF deployments when the pre-emptive
condition is identified; and
initiate the VNF deployments at the network edge
locations when no pre-emptive condition is identified.

10. The system of claim 9, wherein, when mapping the RAN topology, the one or more processors are further configured to:
map standardized functions of the RAN, and
map geographical locations of RAN components.

11. The system of claim 10, wherein, when mapping the RAN topology, the one or more processors are further configured to:
map RAN elements based on the standardized function mapping and the geographical mapping, wherein the RAN elements include virtual central units that support multiple gNodeBs.

12. The system of claim 9, wherein the pre-emptive condition includes:
a real-time network condition that is inconsistent with a historical projection, or
a real-time network condition that violates the policy rules.

13. The system of claim 12, wherein, when receiving the order for VNF deployments, the one or more processors are further configured to:
receive a list of software images and applicable markets for the VNF deployments.

14. The system of claim 9, wherein the one or more processors are further configured to:
solicit, prior to the pushing, user input to authorize the VNF deployments for the first time window.

15. The system of claim 9, wherein, when pre-empting the VNF deployments, the one or more processors are further configured to:
pause the VNF deployments, and
select a second time window to perform the VNF deployments.

16. The system of claim 9, wherein, when identifying the one or more time windows, the one or more processors are further configured to:
analyze real-time transport network and RAN status data.

17. A non-transitory computer-readable medium containing instructions executable by at least one processor, the computer-readable medium comprising one or more instructions to cause the at least one processor to:
receive, in a provider network, an order for virtual network function (VNF) deployments at network locations;
map a radio access network (RAN) topology for each of the network locations;
identify one or more time windows to perform the VNF deployments, based on the order, historical transport and RAN utilization data, and the RAN topology;
select, from the one or more time windows, a first time window to perform the VNF deployments based on stored policy rules;
push software images for the VNF deployments to an image repository in a geographical region near the network locations;
analyze, for the first time window, real-time transport network and RAN status data for a pre-emptive condition;
pre-empt the VNF deployments when the condition is identified; and
initiate the VNF deployments at the network locations when no condition is identified.

18. The non-transitory computer-readable medium of claim 17, wherein the instructions to pre-empt the VNF deployments, further comprising instructions to cause the at least one processor to:
pause the VNF deployments, and
select a second time window to perform the VNF deployments.

19. The non-transitory computer-readable medium of claim 17, wherein the condition includes:
a real-time network condition that is inconsistent with a historical projection, or
a real-time network condition that violates the policy rules.

20. The non-transitory computer-readable medium of claim 17, wherein the instructions to map the RAN topology, further comprise instructions to cause the at least one processor to:
map standardized functions of the RAN,
map geographical locations of RAN components, and
map RAN elements based on the standardized function mapping and the geographical mapping, wherein the RAN elements include virtual central units that support multiple gNodeBs.

* * * * *